D. W. Nearns,
Water Filter,

N° 43,329. Patented June 28, 1864.

Witnesses:
H. E. Clifton
D. J. Woodworth

Inventor
David W. Nearns.

UNITED STATES PATENT OFFICE.

DAVID W. NEARNS, OF ST. LOUIS, MISSOURI.

IMPROVEMENT IN SEA-PIPES FOR VESSELS.

Specification forming part of Letters Patent No. 43,329, dated June 28, 1864.

*To all whom it may concern:*

Be it known that I, DAVID W. NEARNS, of the city and county of St. Louis, and State of Missouri, have invented a new and useful Improvement in Shoes or Sea-Pipes for Steam-Vessels; and I do hereby declare that the following is a full and clear description thereof, reference being had to the accompanying drawings, and to the letters of reference marked thereon and made to form a part of this specification.

This invention refers to the arrangement and mode of securing certain pipes which form the communication between the feed-water devices and the supply of water in which the vessel floats; and the subject-matter of the invention relates, first, to the mode of forming substantial water-tight joints at the points where the said pipes pass through the side of the vessel; and, second, to the arrangement of a certain device by means of which the said pipes may be kept free of ice or other injurious deposits, as hereinafter set forth and represented.

The ordinary method of securing said sea-pipes has been by means of flanges attached to said pipes and bolted to the vessel's side at a suitable point, always below the water-line. This mode is open to some serious objections, among which may be named the fact that a moderate force is liable to disarrange the said fastenings at the side of the vessel, and thereby occasion a dangerous leakage.

The aforesaid difficulty, as well as many others, is sought to be overcome by means of my improvement.

Figure 2:
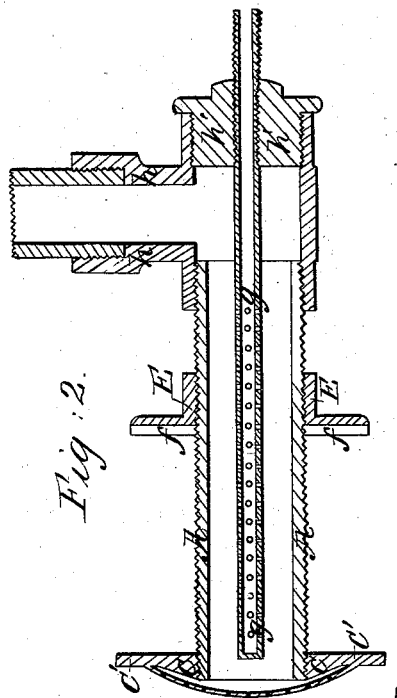
Figure 3:
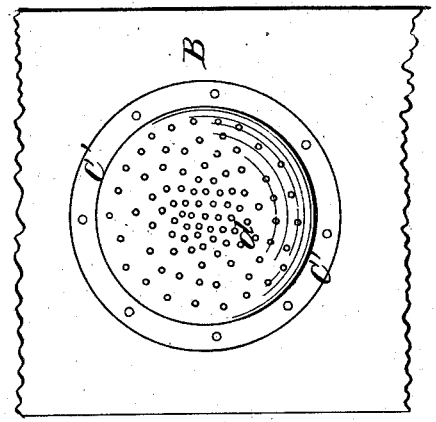
Figure 1:
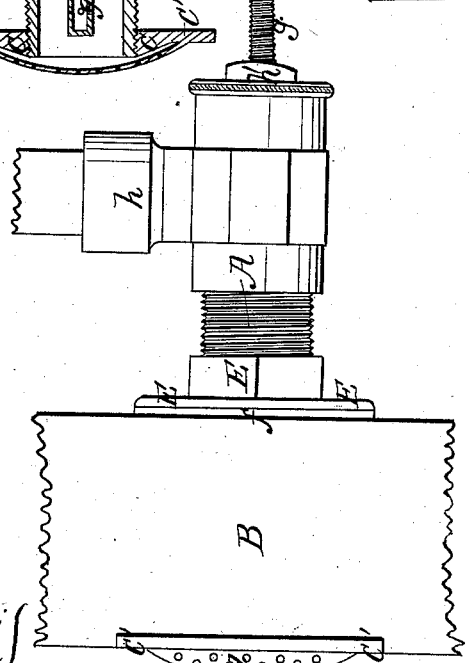

In reference to the accompanying drawings, figure 1 is a plain elevation of my improvement, represented as being attached to the side of a ship or vessel and arranged as for use. Fig. 2 is a vertical sectional view showing especially the perforated pipe by means of which steam or hot water may be employed for thawing out or cleaning the said sea-pipe, and Fig. 3 is an end view of the improvement as seen from the outside of the vessel.

A represents the shoe or sea-pipe, which, being provided with suitable connections, serves as a supply-pipe for the boilers in cases wherein the supply of water is derived from the element surrounding the vessel. The said pipe A is formed with a screw-thread, as shown distinctly in Fig. 2, and is adapted to fit into the nut C. This said nut is formed with suitable flanges, C', by means of which it may be rigidly and permanently secured to the side of the vessel, and is provided with a perforated cap, $d$, through which water may enter the pipe A. This nut C may be let into the side of the vessel in order to prevent it from being disarranged by objects coming in contact with the hull.

E represents a nut, which is constructed and arranged to work upon the pipe A in such manner that it may be made to bear firmly against the inside of the vessel, as shown clearly in Fig. 1, and thereby, in combination with the nut C upon the outside of the vessel, serve to perfect a fastening of such character as to prevent all danger of leakage around the said pipe A, and at the same time allow the said pipe to be readily removed for repairs or other purposes. If desired, a gasket of proper material, as $f$, may be employed between the nut E and the side of the vessel.

$g$ represents a perforated tube or pipe inserted through the head $h'$ of connection $h$ into the pipe A, as shown in Fig. 2, through which steam or hot water may be introduced within the pipe A for the purposes aforesaid.

Persons familiar with devices for like purposes will readily understand the operation of this invention without further explanation.

I do not claim the nuts C E or the cutting of a screw-thread upon the pipe A as considered separately and singly; but

What I claim as new of my own invention, and desire to secure by Letters Patent, is—

1. The arrangement and combination of the nuts C E and pipe A in the formation of the joints of shoes or sea-pipes with the sides of vessels, substantially as herein set forth and represented.

2. The employment of the perforated tube or pipe $g$, in combination with the pipe A, substantially as and for the purposes set forth.

In testimony of which invention I have hereunto set my hand this 18th day of February, 1864, in presence of witnesses.

DAVID W. NEARNS.

Witnesses:
H. E. CLIFTON,
A. J. WOODWORTH.